(12) United States Patent
Brewer et al.

(10) Patent No.: US 10,914,398 B2
(45) Date of Patent: Feb. 9, 2021

(54) SERVO SPOOL VALVE

(71) Applicant: Claverham Limited, Solihull (GB)

(72) Inventors: Paul R. Brewer, Bristol (GB); Reg R. Raval, Yatton (GB); Suat Bekircan, Bath (GB)

(73) Assignee: CLAVERHAM LIMITED, Claverham (GB)

( * ) Notice: Subject to any disclaimer, the term of this patent is extended or adjusted under 35 U.S.C. 154(b) by 0 days.

(21) Appl. No.: 15/904,545

(22) Filed: Feb. 26, 2018

(65) Prior Publication Data
US 2018/0335162 A1    Nov. 22, 2018

(30) Foreign Application Priority Data

May 22, 2017    (EP) ..................... 17172300

(51) Int. Cl.
| F16K 11/07 | (2006.01) |
| F16K 31/524 | (2006.01) |
| F16K 11/14 | (2006.01) |
| F15B 13/044 | (2006.01) |
| F16K 31/52 | (2006.01) |

(52) U.S. Cl.
CPC .... F16K 31/52483 (2013.01); F15B 13/0444 (2013.01); F16K 11/07 (2013.01); F16K 11/0716 (2013.01); F16K 11/14 (2013.01); F16K 31/523 (2013.01); *Y10T 137/8671* (2015.04); *Y10T 137/86622* (2015.04)

(58) Field of Classification Search
CPC ....... Y10T 137/8671; Y10T 137/86622; Y10T 137/86694; F16K 31/52843; F16K 11/07; F16K 11/0716; F16K 11/14; F16K 31/523; F16K 31/0613; F16K 31/0603; F15B 13/0444

USPC ............ 137/625.69, 625.65, 625.26, 625.67; 251/129.11, 129.2, 229, 251, 296
See application file for complete search history.

(56) References Cited

U.S. PATENT DOCUMENTS

| 4,672,992 A | * | 6/1987 | Vanderlaan | ......... F15B 13/0402 137/331 |
| 4,793,377 A | | 12/1988 | Haynes et al. | |

(Continued)

FOREIGN PATENT DOCUMENTS

| GB | 1216533 A | 12/1970 |
| JP | S60164003 A | 8/1985 |

(Continued)

OTHER PUBLICATIONS

Extended European Search Report for International Application No. 17172300.0 dated Sep. 29, 2017, 7 pages.

*Primary Examiner* — Kelsey E Cary
(74) *Attorney, Agent, or Firm* — Cantor Colburn LLP

(57) ABSTRACT

A spool valve arrangement comprising a spool arranged for linear movement within a bore to regulate flow of fluid through the bore according to the linear position of the spool relative to the bore, the spool having an end arranged to be engaged, in use, by a drive member to cause the linear movement, the spool valve arrangement further comprising a sliding block component moveably attached to the spool end and arranged to engage with the drive member, in use, such that the drive member engages with the spool end via the sliding block component and the sliding block component moves relative to the spool to compensate for non-linear movement of the drive member.

5 Claims, 4 Drawing Sheets

(56) References Cited

U.S. PATENT DOCUMENTS

| | | | |
|---|---|---|---|
| 4,825,904 | A | 5/1989 | Grau et al. |
| 5,504,409 | A | 4/1996 | Elrod |
| 5,551,481 | A | 9/1996 | Elrod |
| 6,000,678 | A | 12/1999 | Coakley |
| 7,828,245 | B2 | 11/2010 | Suisse et al. |
| 8,210,206 | B2 | 7/2012 | Coakley |

FOREIGN PATENT DOCUMENTS

| | | |
|---|---|---|
| JP | H0581511 U | 11/1993 |
| JP | H09257137 A | 9/1997 |
| WO | 9002884 A1 | 3/1990 |
| WO | 2005111431 A1 | 11/2005 |

\* cited by examiner

US 10,914,398 B2

SERVO SPOOL VALVE

FOREIGN PRIORITY

This application claims priority to European Patent Application No. 17172300.0 filed May 22, 2017, the entire contents of which is incorporated herein by reference.

TECHNICAL FIELD

The present disclosure relates to servo spool valves.

BACKGROUND

Servovalves are well-known in drive or actuator systems for converting input power into mechanical drive power. Conventional servo spool valves comprise a spool, linearly moveable within a bore or sleeve in a valve cylinder or housing in response to a control input, such as to vary hydraulic fluid flow paths through the valve to a control port to provide output drive power.

Conventionally, rotational motion of a motor is converted into linear motion of the spool. Torque motor driven servo spool valves are well-known, and find application in a wide range of technical fields. A rotary torque motor has a drive member extending eccentrically from the motor rotor, which comes into contact with an end of the spool causing the spool to move linearly within the bore, thus controlling the flow of fluid to the valve control port.

The contact mechanism between the eccentric member and the spool can take various forms such as ball-type, which provides a point contact, and pin/roller type, which provides a linear contact.

Direct drive valves (DDVs) are also known in which the eccentric drive member is directly connected to the spool with a flexible metal rod.

Safety, precision and reliability of spool valves is crucially important, particularly in e.g. the aircraft industry where such valves are extensively used, and where faults or failure can have catastrophic consequences. Therefore, with conventional valves, very close manufacturing tolerances and alignment between the eccentric drive member and the spool are necessary to prevent backlash and hysteresis. Further, in arrangements with a point or line contact between the eccentric member and the spool, the contact area is small, thus resulting in high local pressures. This can lead to premature wear which can, in turn, lead to breakdown. High contact pressures at the contact surfaces limit shear (breakout) force and poor lubrication of the valve drive mechanism, leading to unpredictable friction forces and valve performance.

There is a need for an improved servo spool valve arrangement that overcomes these problems and that may permit greater manufacturing tolerances.

SUMMARY

Accordingly, there is provided a spool valve arrangement comprising a spool arranged for linear movement within a bore to regulate flow of fluid through the bore according to the linear position of the spool relative to the bore, the spool having an end arranged to be engaged, in use, by a drive member to cause the linear movement, the spool valve arrangement further comprising a sliding block component moveably attached to the spool end and arranged to engage with the drive member, in use, such that the drive member engages with the spool end via the sliding block component and the sliding block component moves relative to the spool to compensate for non-linear movement of the drive member.

Preferred embodiments will now be described, by way of example only, with reference to the drawings.

DETAILED DESCRIPTION

Figure 1:
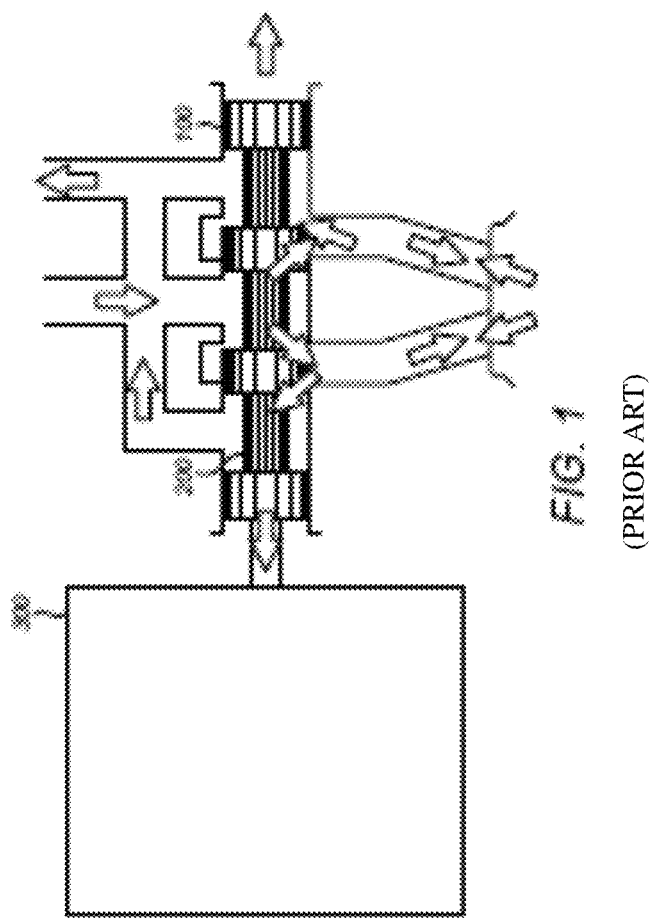
FIG. 1 shows a schematic view of the basic operation of a conventional single stage servo spool valve.

Referring briefly to FIG. 1 to describe the basic operation of a torque motor driven servo spool valve, the valve spool 100 is arranged to move linearly within a bore or sleeve (not shown in FIG. 1). The sleeve is provided with ports (not shown in FIG. 1) in flow communication with a pressurised fluid. The spool 100 has spaced recesses 200 which, depending on the linear position of the spool within the sleeve, align with the ports to create fluid flow channels. Fluid may exit the valve via a control port to regulate the position of an actuator or the like. The linear movement of the spool 100 is caused by rotary motion of a torque motor 300 via an eccentric drive member (not shown in FIG. 1).

The present disclosure improves the contact mechanism between the eccentric drive member and the spool to overcome the problems described in the background.

Embodiments will be described with reference to FIGS. 2 to 4. These show a so-called tandem spool valve—i.e. one having two opposing spools (3, 3') driven in opposition by the eccentric drive member. This is, however, just one example. The modification of this disclosure could also be used with a single stage spool valve such as shown in, and described in relation to FIG. 1.

Figure 2:
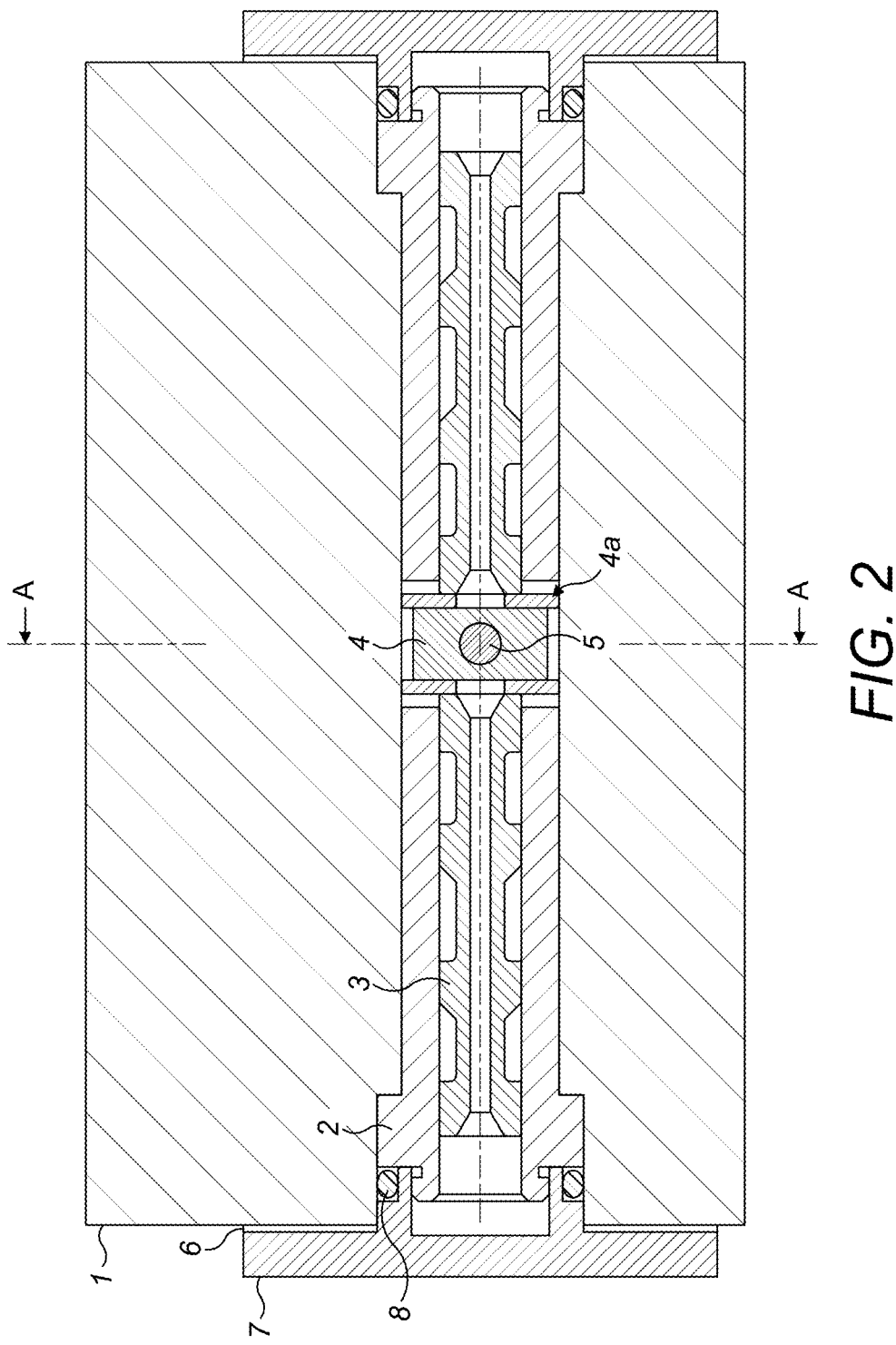
FIG. 2 is a sectional view of a tandem spool valve incorporating the arrangement of the present disclosure.

Referring first to FIG. 2, a direct drive valve (DDV) arrangement comprises, in this example, a housing 1 defining a bore in which are mounted two sleeves 2. As mentioned above, the valve may just have a bore with a single sleeve.

End caps 7 are provided as seals, and to retain the sleeves 2. In a tandem structure, the position of the sleeves 2 can be adjusted by appropriate shimming 6 to ensure flow matching between the two sides. A spool 3 is mounted for linear movement within each sleeve 2.

The linear movement of the spool(s) 3 is caused by an eccentric drive member 5 of a torque motor (see FIG. 3) which contacts the spool end.

Figure 3:
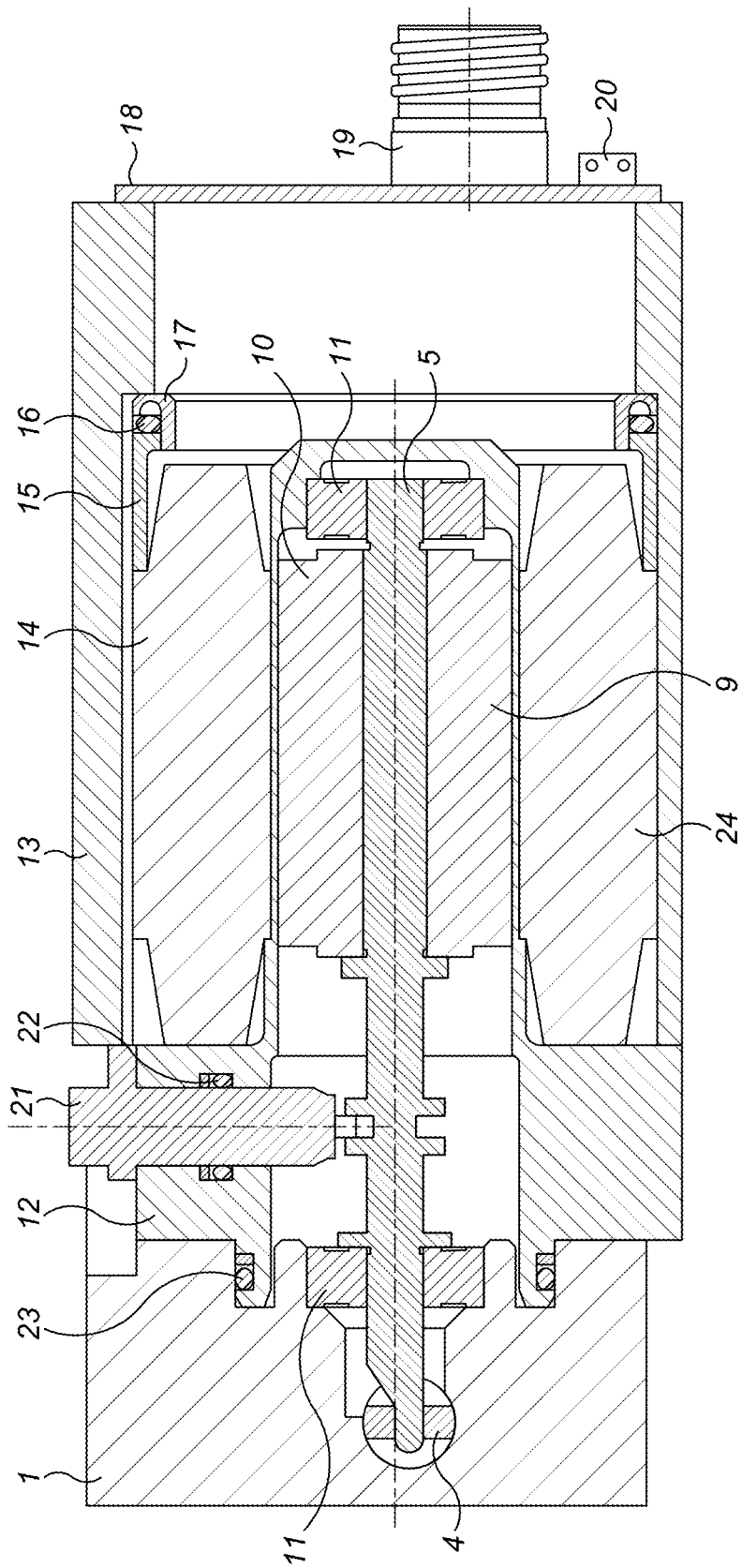
FIG. 3 is a view of the valve of FIG. 2 through section A-A.
Figure 4:
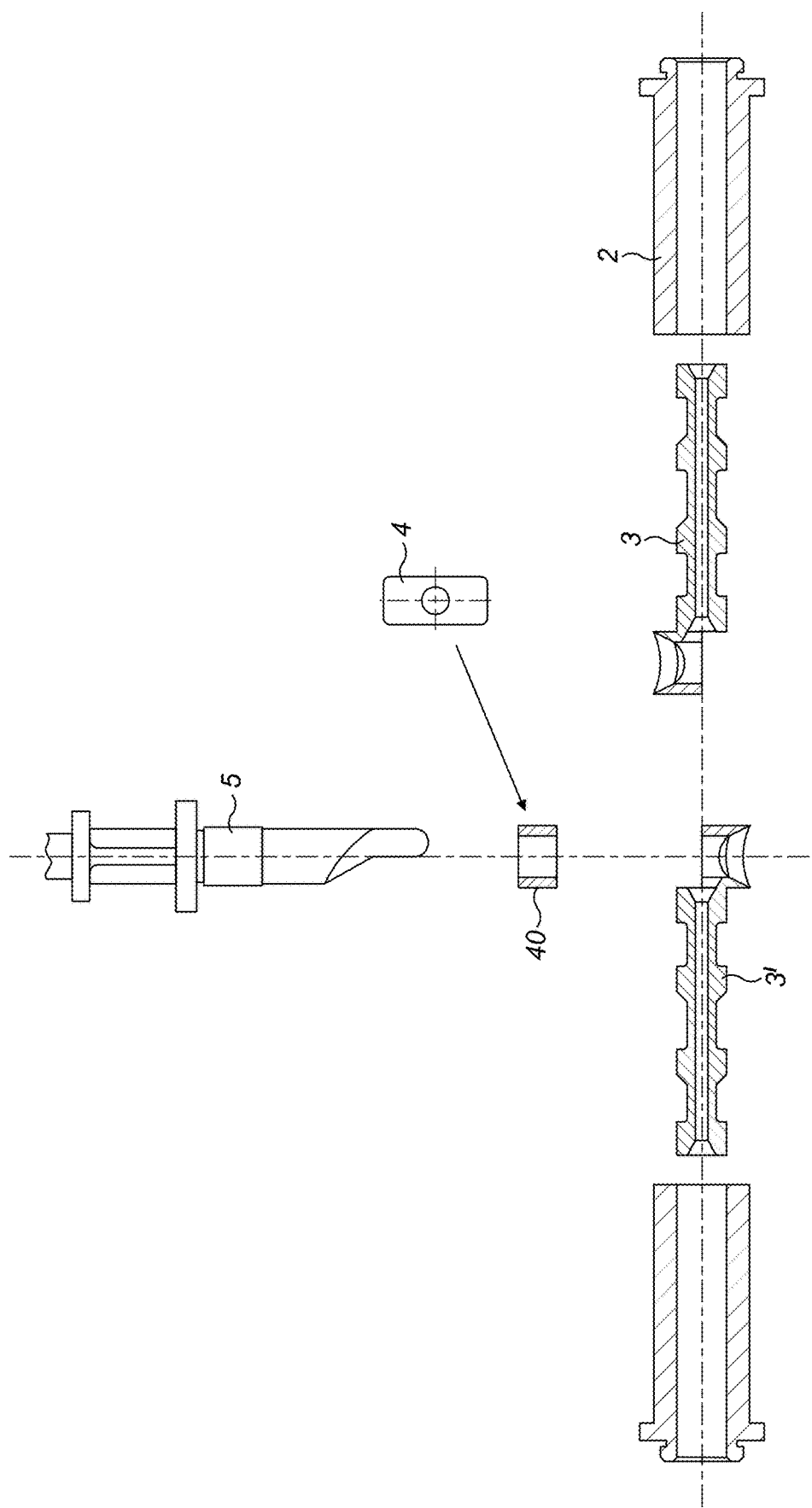
FIG. 4 is an exploded view of the arrangement of FIGS. 2 and 3 with the eccentric drive member of the motor.

As best seen in FIG. 3, the torque motor consists of a stator 24 which includes laminations and drive windings. These windings are connected to receive an electrical drive signal from an external source (not shown). The control of the spool motion is provided by applying controlled currents to the motor. The controlled currents to the motor are derived by taking a spool position signal and comparing with a demand signal and processing them using appropriate control laws. Motor damping may be further enhanced using an inbuilt stator coil and creating a short circuit that will result in Eddy current damping. This damping enables control laws to be incorporated that will increase the overall performance whilst maintaining stability of the system. It should be noted that this arrangement can use multiple coils for redundancy in either the driven or damping motor coils. The torque motor shaft and stator may be separated from each other by a membrane housing 12 retained between the motor housing 13 and the valve body 1 by means e.g. bolts or other fasteners, not shown. The membrane may be manufactured from a non-magnetic material to minimise the reduction of the rotor magnetic performance. Sealing to external environment may be provided by O-rings 23 and 22. The stator of the motor is preferably radially retained inside the motor housing by a key/Loctite™ adhesive 14. Its axial retention, however, may be provided by spacers 15 and 17 and a spring 16. End cover 18 to motor housing may include electrical connector 19 and fasteners 20. The motor shaft may be supported by two bearings 11, one of which is located inside the membrane housing and the other one is mounted into bore of valve body. The motor rotor magnets 9 are mounted on the motor shaft and retained by a non-magnetic sleeve 10. The assembly may also include a potentiometer, linear variable differential transformer (LVDT) 21 or rotary variable differential transformer (RVDT) to measure position of the motor shaft or spools. These devices can be connected to the drive mechanism or to the ends of the spools.

Returning now to FIG. 2, in the present disclosure, a sliding block component 4 is provided between the eccentric drive member 5 and the spool(s) 3.

The sliding block 4 is configured to be moveably attached to the end 4a of the spool(s) 3 and also to engage with the eccentric drive member 5, in use, so as to act as an interface between the eccentric drive member and the spool(s) 3. In the example shown, where the valve arrangement has two spools 3, 3' having their respective inner ends directed toward each other, the eccentric drive member 5 extends intermediate these ends to opposingly linearly move the spools 3, 3' and so the sliding block 4 will be located between the two inner ends. In a valve arrangement with only one spool, the sliding block 4 is arranged at the end 4a of the spool 3 which is to be contacted by the eccentric drive member 5.

The attachment of the sliding block 4 to the spool end(s) can be realised in any way provided there is scope for some movement of the sliding block 4 relative to the spool to compensate for the rise and fall effect of the eccentric drive member 5 as it rotates. In the preferred example, a slot (not shown) is provided in the end of the spool(s) 3 and the sliding block 4 is inserted/mounted in the slot(s).

The engagement between the eccentric drive member 5 and the sliding block 4 can also be realised in various ways. In the embodiment shown, a hole or recess 40 is provided in the sliding block 4 dimensioned to receive the end of the eccentric drive member 5. The result is that the end of the eccentric drive member 5 has a greater contact surface area, due to the end being mounted in a sliding block 4, than the conventional point, linear or direct contact with the spool end. This essentially creates a hydrostatic bearing. The dimensional relationship between the eccentric end of the motor shaft and sliding block 4 is such as to provide minimal frictional forces, near zero backlash and a large contact area which assists in meeting high chip shear force requirements. Additionally, because the motor rotor, bearings and sliding block will usually be immersed in return pressure hydraulic fluid this ensures enhanced hydrostatic lubrication. Sealing to external environment is preferably provided by a motor membrane and by O-rings at the spool sleeve ends 8.

The sliding block 4 is preferably made of a material having good bearing properties e.g. bronze. The sliding block can be coated with a friction reducing coating.

The invention claimed is:

1. A spool valve arrangement comprising:
    a spool having a first spool end and a second spool end, the spool arranged for linear movement within a bore to regulate flow of fluid through the bore according to the linear position of the spool relative to the bore, the first spool end arranged to be engaged, in use, by an elongate drive member extending from a proximal end in engagement with a torque motor to a distal end that engages the spool end to cause the linear movement; and
    a sliding block component moveably attached to the first spool end and arranged to receive the distal most end of the elongate drive member, in use, such that a distal most portion of the distal end of the elongate drive member engages with the first spool end via the sliding block component and the sliding block component moves relative to the spool to compensate for non-linear movement of the elongate drive member, the sliding block component being in a planar contract across the first spool end.

2. The spool valve arrangement of claim 1, wherein the sliding block component is attached to the spool end by means of a slot formed in the spool end into which the sliding block component engages.

3. The spool valve arrangement of claim 1, wherein the sliding block component is provided with a recess configured to receive an end of the elongate drive member.

4. The spool valve arrangement of claim 1, comprising a second spool arrangement for linear movement in an opposite direction to the linear movement of the spool, the second spool having a second end facing the end of the spool, the sliding block component being disposed between and attached to the spool end and the second end of the second spool.

5. An actuator drive assembly comprising:
    a torque motor;
    an elongate drive member driven by said torque motor; and
    a spool valve arrangement comprising:
        a spool having a first spool end and a second spool end, the spool arranged for linear movement within a bore to regulate flow of fluid through the bore according to the linear position of the spool relative to the bore, the first spool end arranged to be engaged, in use, by the elongate drive member to cause the linear movement, wherein the elongate drive member extends from a proximal end in engagement with the torque motor to a distal end that engages the first spool end; and
        a sliding block component moveably attached to the first spool end and arranged to receive the distal most end of the elongate drive member, in use, such that a distal most portion of the distal end of the elongate drive member engages with the first spool end via the sliding block component and the sliding block component moves relative to the spool to compensate for non-linear movement of the elongate drive member, the sliding block component being in a planar contract across the first spool end.

* * * * *